(12) United States Patent
Shroff et al.

(10) Patent No.: US 9,316,824 B2
(45) Date of Patent: Apr. 19, 2016

(54) OPTOMECHANICAL MODULE FOR CONVERTING A MICROSCOPE TO PROVIDE SELECTIVE PLANE ILLUMINATION MICROSCOPY

(75) Inventors: Hari Shroff, Bethesda, MD (US); Yicong Wu, Bethesda, MD (US); Gary Rondeau, Bethesda, MD (US)

(73) Assignee: The United States of America, as represented by the Secretary, Department of Health and Human Services, Washington, DC (US)

( * ) Notice: Subject to any disclaimer, the term of this patent is extended or adjusted under 35 U.S.C. 154(b) by 176 days.

(21) Appl. No.: 14/003,380

(22) PCT Filed: Mar. 2, 2012

(86) PCT No.: PCT/US2012/027524
§ 371 (c)(1),
(2), (4) Date: Jan. 14, 2014

(87) PCT Pub. No.: WO2012/122027
PCT Pub. Date: Sep. 13, 2012

(65) Prior Publication Data
US 2014/0126046 A1   May 8, 2014

Related U.S. Application Data

(60) Provisional application No. 61/449,422, filed on Mar. 4, 2011.

(51) Int. Cl.
*G02B 21/06* (2006.01)
*G02B 21/00* (2006.01)

(52) U.S. Cl.
CPC ............ *G02B 21/06* (2013.01); *G02B 21/0004* (2013.01)

(58) Field of Classification Search
CPC .... G02B 7/003; G02B 21/00; G02B 21/0032; G02B 21/0076; G02B 21/008; G02B 21/02; G02B 21/06; G02B 21/16; G02B 21/18; G02B 21/24; G02B 21/26; G02B 21/34; G02B 21/36; G02B 21/365; G02B 21/367
USPC ................ 359/368, 369, 372, 385, 388, 390, 359/391–393; 250/458.1, 459.1, 250/461.1–461.2
See application file for complete search history.

(56) References Cited

U.S. PATENT DOCUMENTS

| 5,969,854 | A | 10/1999 | Stelzer et al. | |
| 7,324,200 | B2 * | 1/2008 | Shimada | 356/417 |
| 7,787,179 | B2 * | 8/2010 | Lippert et al. | 359/385 |
| 2009/0174937 | A1 | 7/2009 | Holy et al. | |
| 2010/0067104 | A1 * | 3/2010 | Lippert et al. | 359/391 |
| 2011/0115895 | A1 * | 5/2011 | Huisken | 348/79 |

FOREIGN PATENT DOCUMENTS

WO       2010014244 A2    2/2010

* cited by examiner

*Primary Examiner* — Stephone B Allen
*Assistant Examiner* — Adam W Booher
(74) *Attorney, Agent, or Firm* — Polsinelli PC (57) ABSTRACT

A module for engagement with a conventional microscope to provide selective plane illumination microscopy is disclosed. The module is coupled to the translational base of the microscope and defines a mounting having a mount body in which an excitation objective having a first longitudinal axis is engaged to one portion of the mount body and a detection objective having a second longitudinal axis is engaged to another portion of the mount body such that the first longitudinal axis is in perpendicular geometric relation with the second longitudinal axis.

19 Claims, 9 Drawing Sheets
(2 of 9 Drawing Sheet(s) Filed in Color)

OPTOMECHANICAL MODULE FOR CONVERTING A MICROSCOPE TO PROVIDE SELECTIVE PLANE ILLUMINATION MICROSCOPY

FIELD

This document relates to an optomechanical arrangement for converting a microscope, and in particular to an optomechanical arrangement having a module for mounting a pair of objective lenses to convert a conventional microscope to provide selective plane illumination microscopy.

BACKGROUND

Selective plane illumination microscopy (SPIM) and related technologies employ parallelized excitation and perpendicular detection geometry to permit optically sectioned volumetric interrogation of living samples, therefore enabling the study of in toto development or neuronal dynamics at high frame rates. In most implementations, the SPIM system is designed around the specimen, thereby requiring novel sample preparation, such as embedding the sample in an agarose gel, which precludes the use of conventional sample mounts, such as glass cover slips, that are used with many conventional microscopes. Although other types of microscopy, such as oblique plane microscopy (OPM) use the same objective to illuminate as well as detect the specimen and can accommodate the above novel sample preparation, such a microscopy system suffers from a low numerical aperture relative to other methodologies, and therefore requires extensive optics to correct aberrations that result from the light sheet being tilted relative to the detection plane of the microscope. As such, it would be desirable to be able to easily convert an existing conventional microscope that can accommodate novel sample preparation while providing the benefits of selective plane illumination microscopy.

However, there is no provision in the prior art for converting conventional microscopes to provide selective plane illumination microscopy. As such, there is a need in the art for a module that mounts a pair of objective lenses to a conventional microscope in order to provide selective plane illumination microscopy.

SUMMARY

In an embodiment, a module for converting a microscope to provide selective plane illumination microscopy may including a mount defining a mount body and an excitation objective having a first longitudinal axis engaged to one portion of the mount body and a detection objective having a second longitudinal axis engaged to another portion of the mount body, wherein the excitation objective and the detection objective are engaged to the mount such that the first longitudinal axis intersects the second longitudinal axis in a perpendicular geometric relation.

In another embodiment, a converted microscope may include a base engaged to a translation stage and a sample stage. The translation stage being adapted to move in the z direction and the sample stage being adapted to move the sample in the x-y-z directions. A mount is engaged to the translation stage for movement of the mount in the z direction with the mount defining a mount body. The mount further includes an excitation objective engaged to one portion of the mount body and oriented along a first longitudinal axis and a detection objective engaged to another portion of the mount body and oriented along a second longitudinal axis, wherein the excitation objective and the detection objective are oriented such that the first longitudinal axis and the second longitudinal axis are oriented in a perpendicular geometric relation to each other.

In yet another embodiment, a method of converting a microscope to provide selective plane illumination microscopy may include:
providing a module including:
a mount defining a mount body; and
an excitation objective having a first longitudinal axis engaged to one portion of the mount body and a detection objective having a second longitudinal axis engaged to another portion of the mount body, wherein the excitation objective and the detection objective are engaged to the mount such that the first longitudinal axis intersects the second longitudinal axis in a perpendicular geometric relation;
providing a microscope including:
a base engaged to a translation stage and a sample stage, the translation stage being adapted to move the mount in the z direction and the sample stage being adapted to move the sample in the x-y-z directions; and
engaging the mount of the module to the microscope in order to provide selective plane illumination microscopy.

In a further embodiment, a converted microscope may include:
a base engaged to a translation stage and a sample stage, the translation stage being adapted to move in the z direction and the sample stage being adapted to move a sample in the x-y-z directions relative to the base;
a mount engaged to the translation stage for moving the mount in the z direction, the mount defining a mount body, the mount further including a first objective engaged to one portion of the mount body and oriented along a first longitudinal axis and a second objective engaged to another portion of the mount body and oriented along a second longitudinal axis, wherein the first objective and the second objective are oriented such that the first longitudinal axis and the second longitudinal axis are oriented in a perpendicular geometric relation to each other;
at least one SPIM arrangement in communication with the first objective and the second objective with the SPIM arrangement including a light source for generating a first plurality of light sheets and a second plurality of light sheets in alternating fashion through the first objective and the second objective, respectively, for producing sequence of excitation in a sample that generates an alternating sequence of a first fluorescent emission and then a second fluorescent emission, wherein the first fluorescent emission is oriented in perpendicular orientation relative to the second fluorescent emission.

In another embodiment, a process for enhancing axial resolution in an image may include:
producing a first plurality of light sheets in alternating sequence with a second plurality of light sheets for generating a fluorescence excitation by a sample in which a first plurality of fluorescent emissions and a second fluorescent emissions are detected in alternating sequence;
detecting the alternating sequence of the first plurality of fluorescent emissions and the second plurality of fluorescent emissions, wherein the first plurality of fluorescent emissions includes a first plurality of images and the second plurality of fluorescent emission includes a second plurality of images' registering a respective pair of images from the first plurality of images and the second plurality of images; and fusing the respective pair of images such that one of the pair of images is oriented in perpendicular fashion with the other one of the pair of images.

Additional objectives, advantages and novel features will be set forth in the description which follows or will become apparent to those skilled in the art upon examination of the drawings and detailed description which follows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Corresponding reference characters indicate corresponding elements among the view of the drawings. The headings used in the figures should not be interpreted to limit the scope of the claims.

DETAILED DESCRIPTION

Selective plane illumination microscopy (SPIM) and related technologies employ parallelized excitation and perpendicular detection geometry to permit optically sectioned volumetric interrogation of living samples, therefore enabling the study of in toto development or neuronal dynamics at high frame rates. In most implementations, the SPIM system is designed around the specimen, thereby requiring novel sample preparation, such as embedding the sample in an agarose gel, which precludes the use of conventional sample mounts, such as glass cover slips, that are used with many conventional microscopes. Although other types of microscopy, such as oblique plane microscopy (OPM) use the same objective to illuminate and detect the specimen, such a microscopy system suffers from a low numerical aperture relative to other methodologies, and therefore requires extensive optics to correct aberrations that result from the light sheet being tilted relative to the detection plane of the microscope. As such, it would be desirable to be able to easily convert an existing conventional microscope, for example an inverted microscope, to provide the benefits of selective plane illumination microscopy.

As such, embodiments of the converted microscope and conversion module as set forth herein include particular components, properties and characteristics that address issues related to converting a conventional microscope to provide selective plane illumination microscopy. The converted microscope described herein includes a conversion module having a mount configured to engage a pair of objective lenses that are in perpendicular geometric relation to each other to a conventional microscope for converting the microscope to provide selective plane illumination microscopy, while also maintaining the flexibility and sample geometry of commercially available inverted microscopes. Further details of the converted microscope are discussed in greater detail below.

Figure 1:
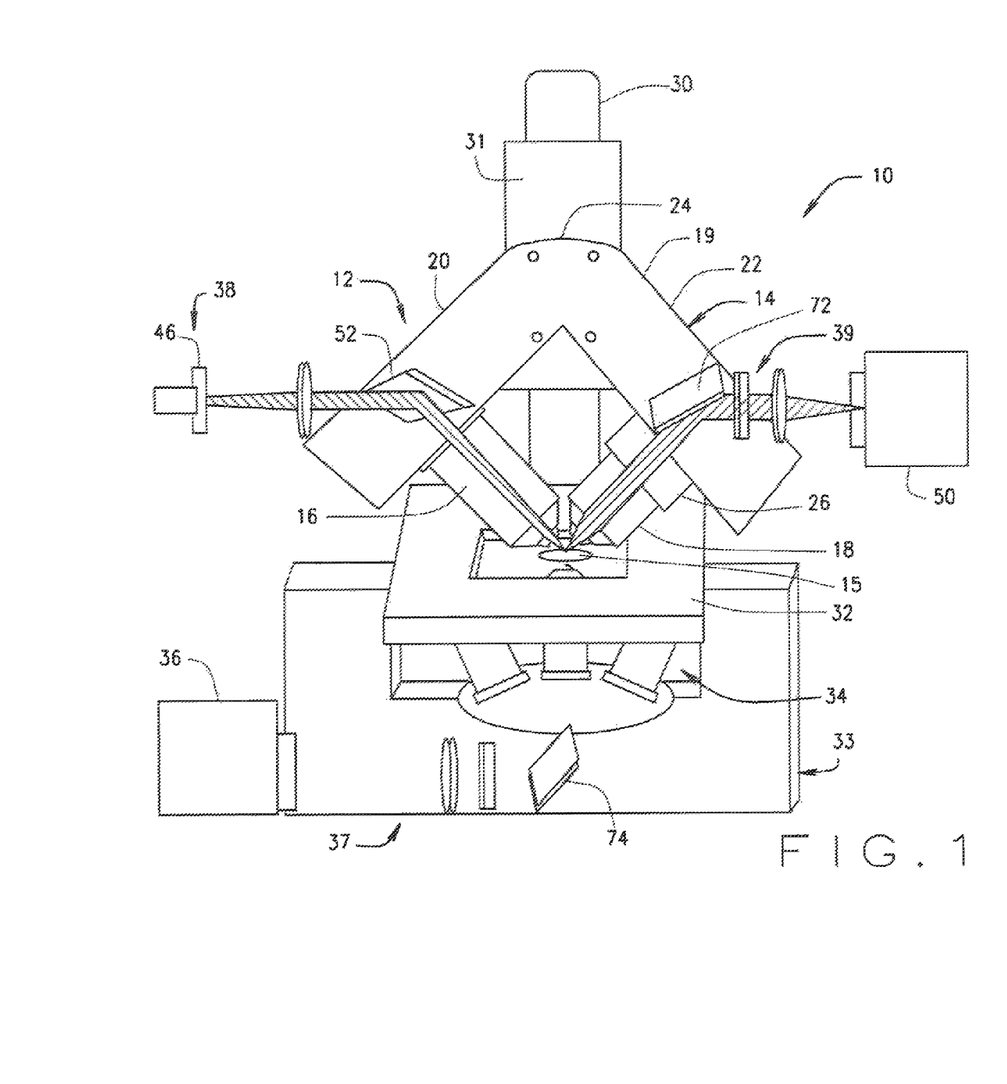
FIG. 1 is a simplified illustration showing a converted microscope that has been converted to provide selective plane illumination microscopy.
Figure 2:
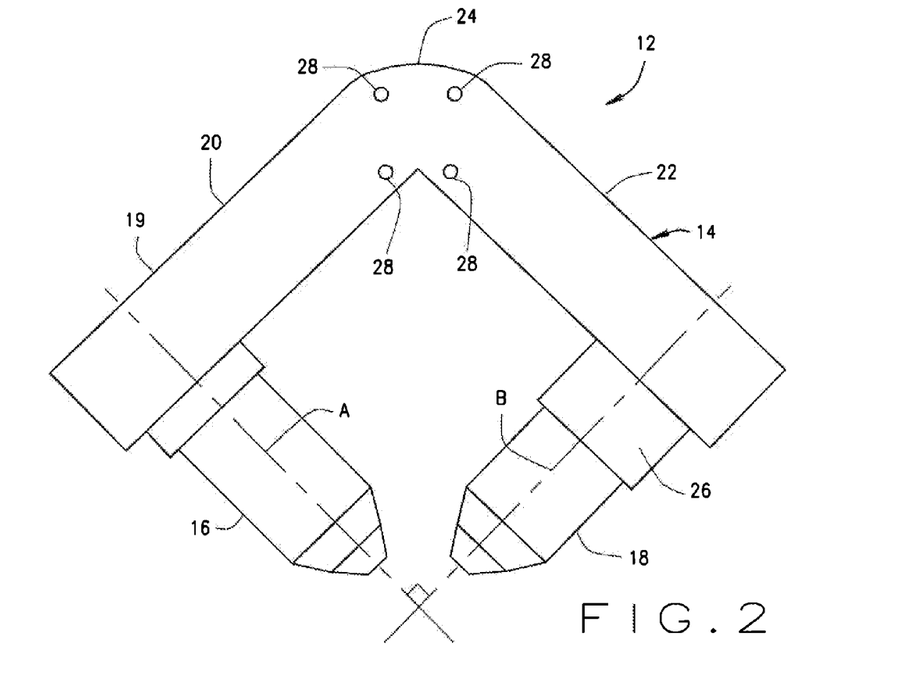
FIG. 2 is a simplified illustration showing one embodiment of a module for mounting on the converted microscope for conversion to the selective plane illumination microscopy.

Referring to the drawings, various embodiments of the converted microscope are illustrated and generally indicated as 10 and 100 in FIGS. 1-13. In general, as shown in FIGS. 1 and 2, the converted microscope, designated 10, may include a microscope base 33 having a three-dimensional translational sample stage 32 engaged to an objective translational stage 31 in which a conversion module 12 is coupled thereto for providing the capability of performing selective plane illumination microscopy by the converted microscope 10. The conversion module 12 may include a mount 14 engaged to the translation stage 31 in which the mount 14 has an excitation objective 16 mounted on one portion of the mount 14 and a detection objective 18 mounted on another portion 14 of the mount 14. In one arrangement, the excitation objective 16 defines a longitudinal axis A, while the detection objective defines a longitudinal axis B such that longitudinal axis A intersects longitudinal axis B in a perpendicular geometric orientation.

Referring specifically to FIG. 2, in one embodiment the mount 14 of the conversion module 12 may include a mount body 19 defining a first arm 20 and a second arm 22 that meet at an apex portion 24. The excitation objective 16 may be mounted on the first arm 20 and the detection objective 18 may be mounted on the second arm 22 such that the longitudinal axis A of the excitation objective 16 intersects the longitudinal axis B of the detection objective 18 in a perpendicular geometric relation as noted above. In one embodiment, a sample 15 may be mounted onto a coverslip 48 (FIG. 4) at the point of intersection between the longitudinal axes A and B. In some embodiments, a mirror 52, for example a galvometric mirror, may be engaged to the first arm 20 of the mount 14 for sheets of light from a selective plane illumination microscopy (SPIM) arrangement 38 to the excitation objective 16 for illuminating the sample 15 to generate a fluorescence, while another mirror 72 may be engaged to the second arm 22 for directing detected fluorescence transmitted through the detection objective 18 for detection by a camera 50 for capturing one or more images of the fluorescence.

In one embodiment, the apex portion 24 may define a plurality of apertures 28 for engaging the mount to the translational stage 31 using screws (not shown) or other suitable means of attaching the mount 14 to the translational stage 31. In some embodiments, the detection objective may include a piezoelectric objective stage 26 that permits the detection objective 18 to be moved along longitudinal axis B in order to maintain illuminated portions of the sample 15 in focus along the sample plane during selective plane illumination microscopy.

Figure 3:
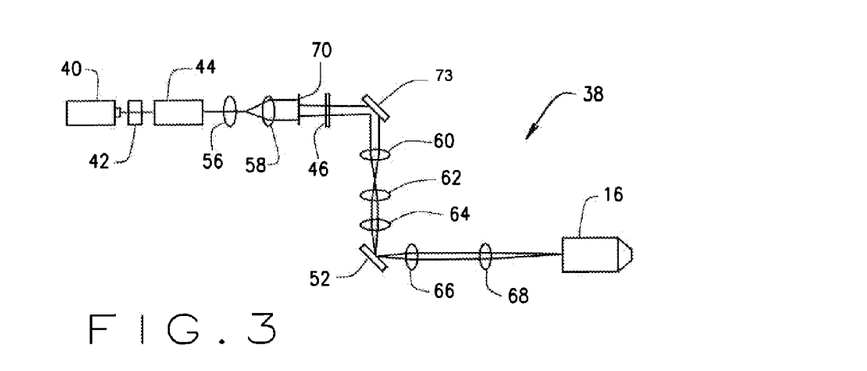
FIG. 3 is a simplified illustration showing a selective plane illumination microscopy arrangement that produces the excitation laser light for illumination of a sample by the converted microscope.

Referring to FIG. 3, the SPIM arrangement 38 will be discussed in greater detail. In one embodiment, the SPIM arrangement 38 generates a sheet of light from a laser source 40 that illuminates sections of the sample 15 with light sheets along the focal plane of the detection objective 18. The laser source 40, such as a continuous wave laser (e.g., diode lasers), generates a laser beam that passes through a half wave plate 42 and an acousto-optic tunable filter (AOTF) component 44. The arrangement of the half wave plate 42 and AOTF component 44 provides for power control and shuttering of the laser beam. The half wave plate 42 allows the polarization of the laser light source 40 to be adjusted. Since the AOTF component 44 preferentially passes horizontal linearly polarized light, the power can be adjusted from zero to a maximum value by rotating the half wave plate 42. This function could also be achieved by using neutral density filters for power control in combination with a mechanical shutter. Once the laser beam passes through the AOTF component 44, the laser beam is transmitted through a pair of first and second lenses 56 and 58 before passing through an iris component 70, which allows for the fine adjustment of the laser beam diameter prior to beam shaping with a rectangular mask 46. In one embodiment, the telescopic pairs of lenses, the third and fourth lenses 60 and 62, the fifth and sixth lenses 64 and 66, and the combination of the seventh lens 68 and the excitation objective 16, each in a 4f configuration, reimage the laser beam that passes through the mask 46 at the sample plane, thereby creating a sheet of light. In some embodiments, a galvonometric mirror 52 may be placed at the focal plane of the fifth lens 64 to translate the light sheet in the plane of the sample 15, thereby enabling high speed volumetric imaging at the sample plane. In some embodiments, the SPIM arrangement 38 may form a part of the conversion module 12 or the SPIM arrangement 38 may be a separate module that is operatively associated with one or more the conversion modules 12 as shall be discussed in greater detail below. In some embodiments, the SPIM arrangement 38 may include periscopes comprised of extra mirrors (not shown) that elevate the laser beam from the optical table surface but do not change the distances between the aforementioned rectangular mask and telescopic lenses and into the excitation objective 16, while additional mirrors may be utilized for laser beam alignment.

In some embodiments, the three-dimensional translational sample stage 32 may be capable of three dimensional translational movement of the sample 15 in the x-y-z directions. Specifically, the sample stage 32 may include various components capable of moving the sample stage 32 in the x-y-z directions such that three dimensional translational movement of the sample 15 relative to the stationary base 33 may be achieved. In addition, the objective translational stage 31 may be directly or indirectly coupled to the mount 14 and is capable of moving the excitation objective 16 and detection objective 18 in the z direction (e.g., upward or downward movement relative to the base 33).

Figure 4:
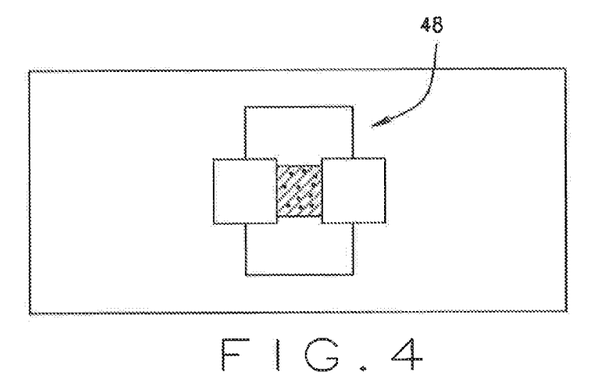
FIG. 4 is a simplified illustration of a coverslip used with the converted microscope.

In one embodiment, the sample 15 as noted above may be mounted in a coverslip 48 in which the sample mounting is made from a parafilm that is cut and melted onto a cleaned 24 mm×50 mm glass coverslip 48. The parafilm may be enclosed in a 4 mm×4 mm area in the center of the coverslip 48 where embryos may be deposited as a sample 15 to be illuminated by the SPIM arrangement 38; however, the parafilm may be enclosed in a different sized area.

In one embodiment, the converted microscope 10 may further include a conventional detection objective arrangement 34 in combination with a detection camera 36 used to detect the illumination of a sample 15 by means other than selective plane illumination microscopy. Other types of microscopy that may be performed on the same conventional microscope 10 include, but not limited to, total internal reflection microscopy (TIRF), confocal microscopy, dark field microscopy, two photon microscopy or any type of optical microscopy that utilizes the conventional detection objective 34. In addition, the detection camera 36 may be in operative communication with a lens and filter arrangement 37 that processes the detected light reflected by a mirror 74 and detected by the conventional detection objective arrangement 34.

Figure 8:
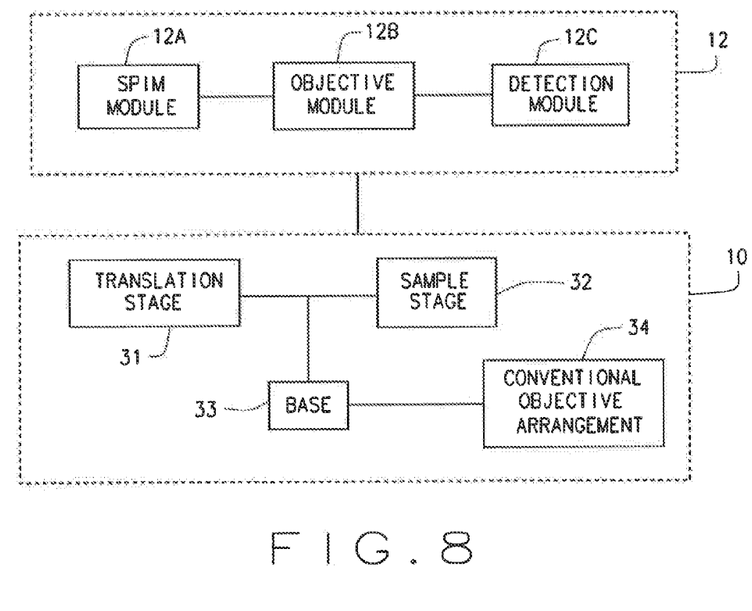
FIG. 8 is a simplified illustration showing one embodiment of the converted microscope with various conversion modules.
Figures 9A, 9B, 9C, 9D, 9E:
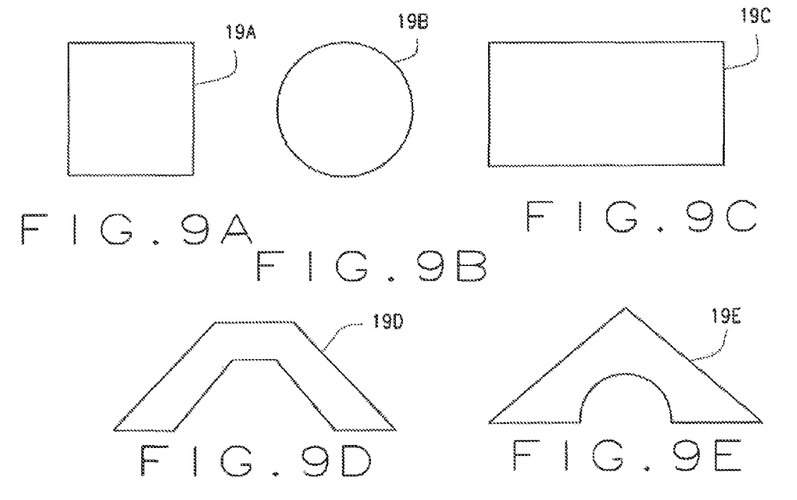
FIGS. 9A, 9B, 9C, 9D and 9E are figures illustrating different configurations of the mount body for the mount.

Referring to FIG. 8, a simplified block diagram illustrates the various components of a conversion module 12 that may be engaged to the converted microscope 10. In some embodiments, the converted microscope 10 may have a plurality of conversion modules 12 directed to various aspects of providing the converted microscope 10 with selective plane illumination microscopy. For example, conversion module 12 may include a SPIM module 12A, an objective module 12B, and a detection module 12C for engagement with either one of the other modules or directly to the structure of the microscope 10, such as the pillar 30, or other structural element of the microscope 10 that allows the excitation objective 16 and detection objective 18 to be oriented above the sample stage 32. In one aspect, the SPIM module 12A includes the components of the SPIM arrangement 38 discussed above (e.g., light source 40, wave plate 42, AOTF 44, mask 46, lenses 56, 58, 60, 62, 64, 66, 68, iris 70 and mirrors 73 and 74) that provide the necessary components to generate and direct sheets of light that are magnified and transmitted through the excitation objective 16, while the objective module 12B includes the mount 14 coupled to the excitation objective 16 used to excite the sample 15 and the detection objective 18 used to detect the florescence emitted by the sample 15. In this arrangement, the detection module 12C may include the lens arrangement 39 for demagnification of the illuminated light and a detection camera 50 to detect the fluorescence emitted by the sample 15 after illumination by the excitation objective 16. However, in other embodiments, the SPIM module 12A, objective module 12B and detection module 12C may be combined into one module 12, the SPIM module and objective module may be combined into one module 12, or the SPIM and the detection modules 12A and 12C may be combined together into one module 12.

Referring to FIGS. 9A-9E, various configurations for the mount 14 are contemplated. As shown in FIG. 2, the module 12 may include a mount 14 having a mount body 19 that defines a first arm 20 and a second arm 22. In other embodiments shown in FIGS. 9A-9E, the mount 14 may be configured to have a square-shaped mount body 19A, a circular-shaped mount body 19B, a rectangular-shaped mount body 19C, a trapezoidal-shaped body 19D, and a pyramidal-shaped body 19E; however, other mounts 14 may be configured to have other shapes and sizes configured for engaging the excitation objective 16 and the detection objective 18 such that the respective longitudinal axes of the objectives 16 and 18 are in perpendicular geometric relation to each other when mounted.

In some embodiments, a method for converting a microscope 10 may include engaging the conversion module 12 to the microscope 10, for example by engaging the apex portion 24 of the mount 14 to the translation stage 31 of the microscope 10. After engagement of the mount 14 to the translation stage 31, longitudinal axis A of the excitation objective 16 is in perpendicular geometric relation to the longitudinal axis B of the detection objective 18. A SPIM arrangement is operatively associated with the excitation objective 16 that generates sheets of light transmitted through the excitation objective 16 to illuminate a sample 15 such that the sheets of light generate a fluorescence that is detected through the detection objective 18.

Figure 11:
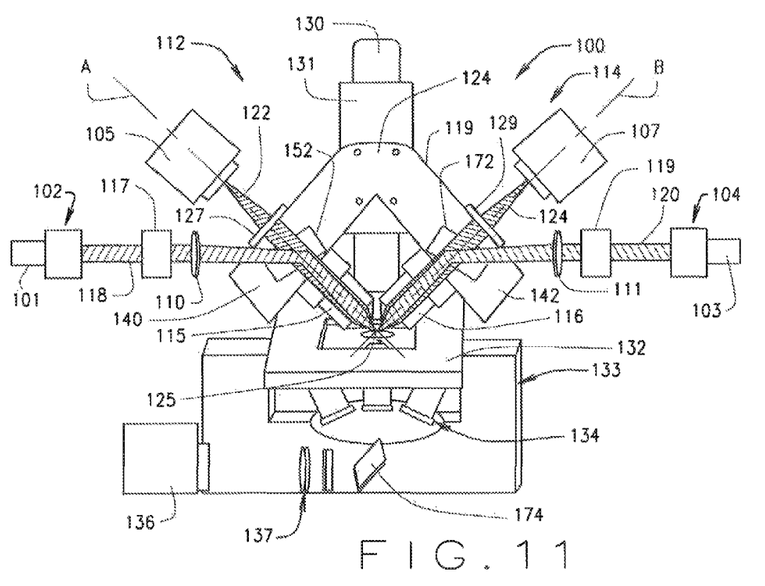
FIG. 11 is a simplified illustration showing another embodiment of the converted microscope that has been converted to provide selective plane illumination microscopy to improve axial resolution.
Figure 12:
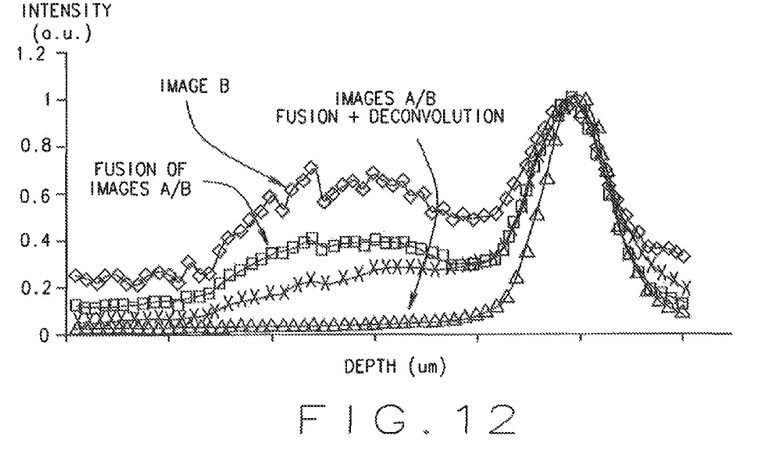
FIG. 12 is a graph showing the axial decay of a highlighted nuclei shown in view B image illustrating that the response of view B image becomes sharper with fusion and/or deconvolution image processing of the view B image.
Figure 13:
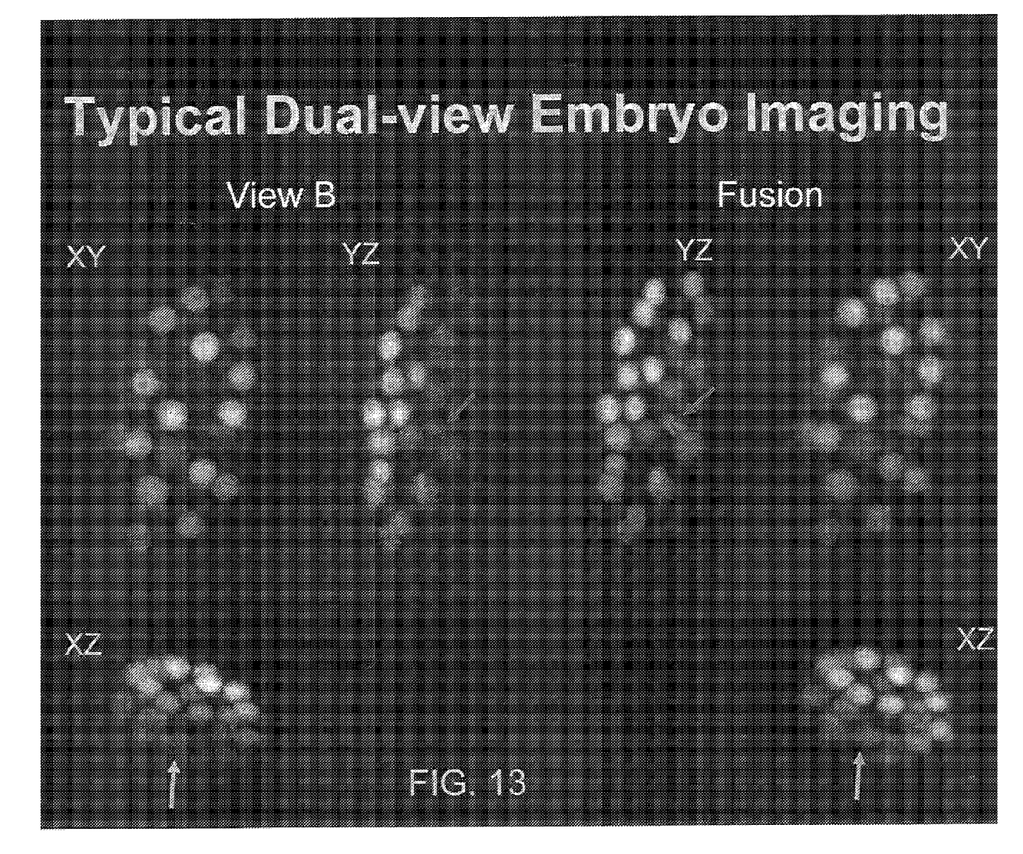
FIG. 13 shows the difference in image resolution between an unprocessed image (view B) and an image processed using the fusion technique taken along three separate orientations.

Referring to FIGS. 11-13, another embodiment of the converted microscope, designated 100, is shown that produces images having enhanced axial resolution using either a dual SPIM arrangement that produces two laser beams for generating fluorescent images that are orthogonally-oriented relative to each other. In an alternative embodiment, a single laser beam arrangement may be split into two different laser beams for achieving the same result. In one arrangement having a dual SPIM arrangement, the converted microscope 100 may include a microscope base 133 having a three-dimensional translational stage 132 engaged to an objective translational stage 131 in which a conversion module 112 is coupled thereto for providing the capability of performing selective plane illumination microscopy by the converted microscope 100 in which a processor (not shown) receives detected sequential images and processes those images to improve axial resolution of a sample 125 as shall be discussed in greater detail below. The conversion module 112 may include a mount 114 engaged to the translation stage 131 in which the mount 114 has a mount body 119 that defines a first arm 140 coupled to a first objective lens 115 and a second arm 142 coupled to a second objective lens 116 in which the first and second arms 140 and 142 meet at an apex portion 124. In one arrangement, the first objective lens 115 defines a longitudinal axis A, while the second objective lens 116 defines a longitudinal axis B such that longitudinal axis A intersects longitudinal axis B in a perpendicular geometric orientation similar to the arrangement shown in FIG. 2. The sample 125 may be mounted on a coverslip (not shown) similar to coverslip 48 (FIG. 4) at the point of intersection between the As further shown in FIG. 11, the converted microscope 100 may include a dual SPIM arrangement that illuminates the sample 125 in alternating sequence for producing images that are orthogonally oriented relative to each other such that a registered and fused composite image of any two orthogonally-oriented images is generated that enhances the axial resolution of the composite image of the sample 125. In such an embodiment, a first light source 101 generates a light beam, such as a laser beam, that is processed by a first SPIM arrangement 102 for generating a first plurality of light sheets 118 from the first light source 101 that illuminates sections of the sample 125 along the focal plane of the first objective lens 115. The SPIM arrangement 102 may include the same components described for SPIM arrangement 38 as discussed above. Once the first plurality of light sheets 118 are generated by the first SPIM arrangement 102, a first galvometric mirror 117 scans the first plurality of light sheets 118 through a first lens 110 which is then reflected off the first dichroic mirror 152 and through the first objective lens 115 for illuminating the sample 125. As the sample 125 is illuminated, fluorescent emissions 124 are emitted by the sample 125 which are then collected by the second objective lens 116 and transmitted to the second dichroic mirror 172. The second dichroic mirror 172 removes most of the laser light 118 and allows only the fluorescent emissions 124 to pass through a lens and emissions filter arrangement 129 that removes any residual laser light and focuses the fluorescent emissions 124 onto a second sensor 107, such as a CMOS detector, for detection and processing of the fluorescent emissions 124.

Similarly, a second light source 103 generates a light beam, such as a laser beam, that is processed by a second SPIM arrangement 104 for generating a second plurality of light sheets 120 from a second light source 103 that sequentially illuminates sections of the sample 125 along the focal plane of the second objective lens 116 in alternate sequence with the first plurality of light sheets 118. The second SPIM arrangement 104 may include the same components described for SPIM arrangement 38 as discussed above. Once the second plurality of light sheets 120 are generated by the second SPIM arrangement 104, a second galvometric mirror 119 scans the second plurality of light sheets 120 through a second lens 111 which are then reflected off the second dichroic mirror 172 and through the second objective lens 116 for illuminating the sample 125. As the sample 125 is illuminated, fluorescent emissions 122 are emitted by the sample 125 which are then collected by the first objective lens 115 and transmitted to the first dichroic mirror 152. The first dichroic mirror 152 removes most of the laser light 120 and allows fluorescent emissions 122 to pass through a lens and emissions filter arrangement 127 that removes any residual laser light and focuses the fluorescent emissions 122 onto a first sensor 105, such as a CMO detector, for detection and processing of the fluorescent emissions 122.

As described above, the converted microscope 100 produces an alternating sequence of images based on the alternating sequence of fluorescent emissions 122 and the fluorescent emissions 124 detected by the first and second sensors 105 and 107 as the sample 125 is illuminated in alternating sequence by the first and second light sources 101 and 103. Referring to the simplified illustration shown in FIG. 10, the first objective lens 115 focuses a plurality of sequential alternating images, for example $A_1$ and $A_2$, embodied in fluorescent emissions 122, while the second objective lens 116 focuses a plurality of sequential alternating images, for example $B_1$ and $B_2$, embodied in fluorescent emissions 124. As shown, images $B_1$ and $B_2$ are oriented perpendicularly relative to images $A_1$ and $A_2$. During the operation of the converted microscope 100, image $A_1$ is detected by second sensor 107 and then image $B_1$ is detected by first sensor 105. Each image $A_1$ and $B_1$ has a lateral resolution and an axial resolution in which the lateral resolution is much sharper than the axial resolution for each image. Once the images $A_1$ and $B_1$ are detected and received by the processor, a method for improving the axial resolution of the images $A_1$ and $B_1$ is executed in which images $A_1$ and $B_1$ are registered together such that one of the images, for example image $A_1$, is rotated in a perpendicular orientation relative to other image, image $B_1$, and then the method transposes image $A_1$ over image $B_1$ to form a composite image having image $A_1$ perpendicular to image $B_1$. In some embodiments, the processor may perform translational adjustments to images $A_1$ and $B_1$ in order to take into account any difference in orientation and alignment of the first and second SPIM arrangements 102 and 104 relative to the sample 125 in which one or both first and second SPIM arrangements 102 and 104 are out of alignment that would require corrective action.

Figure 10:
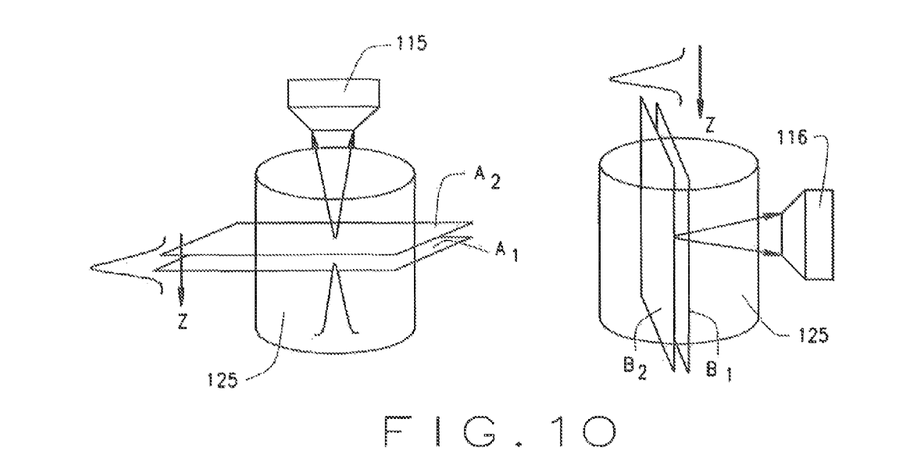
FIG. 10 is a simplified illustration showing the orthogonal orientations of first images ($A_1$, $A_2$) detected by a first sensor and second images ($B_1$, $B_2$) detected by a second sensor prior to undergoing registration and fusion image processing to improve axial resolution.

Once images $A_1$ and $B_1$ are registered, the processor in one embodiment executes a fusion process in which the registered images $A_1$ and $B_1$ are averaged together to form a composite image $A_1B_1$. Because image $A_1$ is perpendicular to image $B_1$, the sharper lateral resolution properties of image $A_1$ are transposed over and applied to enhance the axial resolution of image $B_1$, while the shaper lateral resolution properties of image $B_1$ are similarly transposed over and applied to enhance the axial resolution of image $A_1$. As such, the registered and fused composite image $A_1B_1$ that results has enhanced axial resolution along two different planes of the composite image $A_1B_1$. In one embodiment, the fused process calculates the arithmetical mean of the corresponding images $A_1B_1$ to generate the registered and fused composite image $A_1B_1$. Once the registered and fused composite image $A_1B_1$ is generated, the same method is applied to subsequent images $A_2$ and $B_2$ for generating further composite images having enhanced axial resolution.

Referring to FIG. 12, a graph illustrates the efficacy of the method for enhancing axial resolution by comparing the intensity of an image as a function of depth of the sample 125. The graph shows that view B with no processing exhibits the highest intensity regardless of depth. In comparison, when image B is registered and fused with image A, which is in perpendicular relation to image B, the composite image A,B exhibits a lower intensity, while the same image A,B that undergoes a deconvolution process exhibits the lowest intensity in relation to depth. As such, the resulting low intensity of the composite image exhibits enhanced axial resolution than if the image were not registered and fused together as described above.

As shown in FIG. 13, the axial resolution of an image taken of an embryo along three different planes (XY, YZ and XZ planes) is pictured. The pictures of the embryo along each of the planes clearly show that the axial resolution of the View B images is lower than the same corresponding images that have undergone the registration, fusion and/or deconvolution process described above. The resulting View B image clearly exhibits lower axial resolution than that same image which has undergone the registration and fusion process.

Experiments and Test Results

Experiments for testing the performance of the converted microscope 10 were conducted to test the efficacy of the conversion module 12 when operatively engaged to a conventional microscope, such as an inverted microscope as discussed in greater detail below.

In one test, a conversion module 12 was coupled to a conventional inverted microscope 10 in the area where the illumination pillar of the inverted microscope 10 was removed. The excitation objective 16 and the detection objective 18 were both long working distance, for example 3.5 mm, 0.8 NA water immersion objectives configured to produce and detect a light sheet. The sample stage 33 in combination with the translation stage 31 provides automated 3D orientation of the sample 15 relative to the fixed positions of the excitation objective 16 and detection objective 18 on the mount 14 of the conversion module 12.

The utility of the conventional inverted microscope 10 by coupling to the conversion module 12 was tested by illuminating a sample 15 of *C. elegans* embryogenesis and detecting the fluorescence generated by the sample 15. This test system was chosen for several reasons: 1) the animal has an invariant cell lineage and disruptive phototoxic perturbations do not result in cell lineage compensaton, therefore *C. elegans* embryogenesis represents a stringent test of the effects of phototoxicity during in vivo imaging; and 2) from an application standpoint, development of this technology dovetails with ongoing systems biological approaches in the nematode based on high-throughput imaging.

Figure 5A:
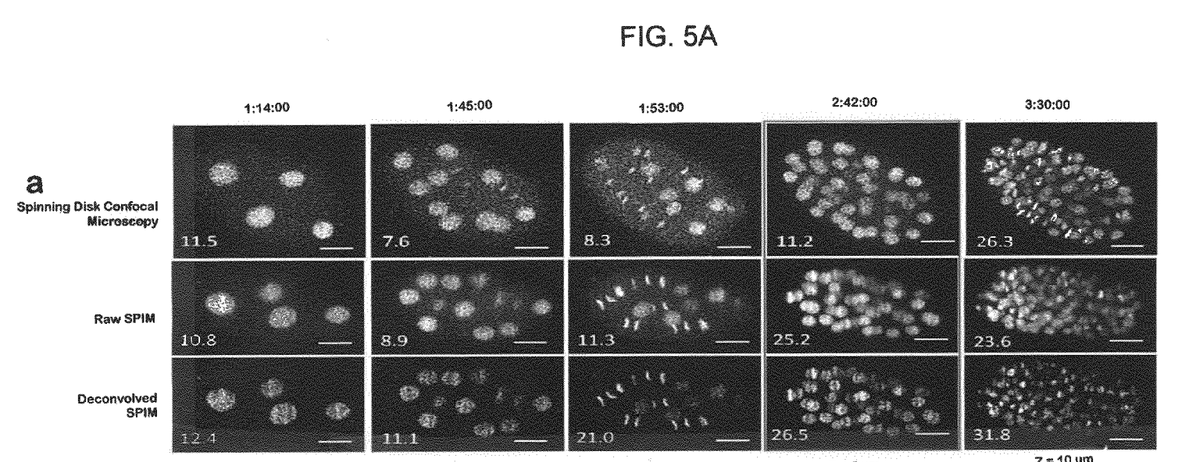
FIG. 5A are images showing the comparison between maximum intensity projections at indicated time points.

As a first application, nuclear cell division was studied by imaging transgenic embryos with GFP-histone markers to explore the potential gain in temporal resolution of the SPIM microscopy performed by the conventional inverted microscope 10 after the conversion module 12 has been engaged. In previous studies employing confocal microscopy, imaging such embryos allowed automated cell lineage tracing as well as a detailed investigation of organogenesis at a single-cell and minute-level resolution in which an imaging rate of approximately 1 volume/minute was maintained during continuous imaging. Unfortunately, the dose of light delivered in confocal microscopy limits the imaging frequency to 1 volume/minute, as higher imaging frequencies result in more photodamage, and thus embryonic arrest. Imaging the same transgenic embryos with the inverted microscope 10 coupled to the conversion module 12 that provides selective plane Illumination microscopy from a two cell stage until hatching, at 30 volumes per minute, which was 30 times faster than current microscopies, such as point scanning microscopy and spinning disk confocal microscopy. Despite the relatively higher temporal sampling, no obvious abnormalities were detected in the imaged embryos in terms of morphology, nor in the timing of the developmental hallmarks, such as the invariant order and orientation of blastomere divisions, gastrulation, pharyngeal shape, elongation and twitching. The embryos hatched at the expected time into viable larva stage 1 animals as shown in the images of FIG. 5A further confirming that the imaging conditions of the converted microscope 10 did not affect embryo development. Compared to similar nonperturbative spinning disk microscopy experiments, the raw images obtained with the converted microscope 10 provided with selective plane illumination microscopy displayed comparable or superior signal-to-noise-ratio. It was also discovered that deconvolution further increased the signal-to-noise-ratio. In addition, cell divisions were resolved in both high temporal and selective detail using the converted microscope 10 as chromosome condensation and kinetics of cytokinesis, which are processes that are generally obscured at the slower 1 volume per minute imaging rates afforded by conventional spinning disk confocal microscopy. It was also noted that the greatly increased temporal resolution capability of the converted microscope 10 provided with selective plane illumination microscopy may aid in automated cell lineage tracing as nuclei become easier to track at higher frame rates since the imaging rate of 1 volume per minute every 2 seconds allows examination of cell biological events at subcellular resolution, although in the context of the intact animal embryo.

Figure 6:
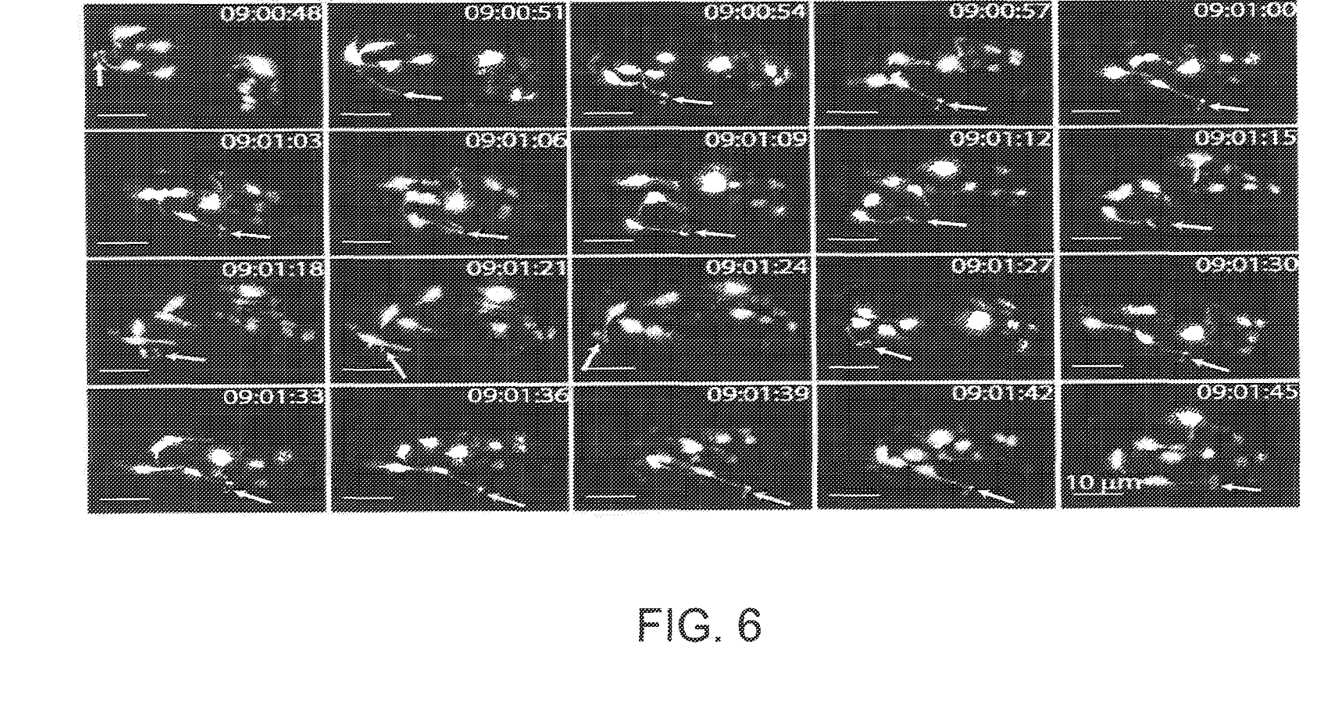
FIG. 6 are images showing the maximum intensity projections shown every three seconds using images taken from the same dataset used to generate the images in FIGS. 5A and 5B.
Figure 7A:
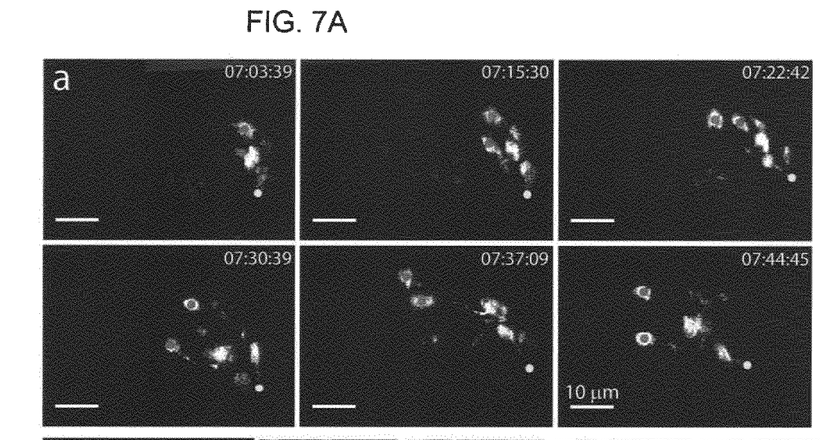
FIG. 7A are images of selected maximum intensity projections showing manual annotations of CAN neurons (red, pink dots) and anterior tip embryo (yellow dot).
Figure 7B:
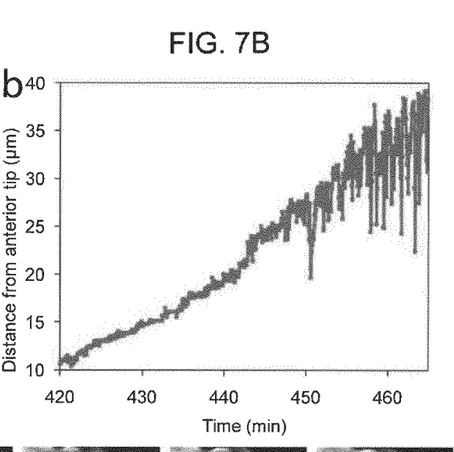
FIG. 7B is a chart illustrating the quantification of three dimensional displacement between CAN neurons and anterior embryo tip over a 45 minute span of time.
Figure 7C:
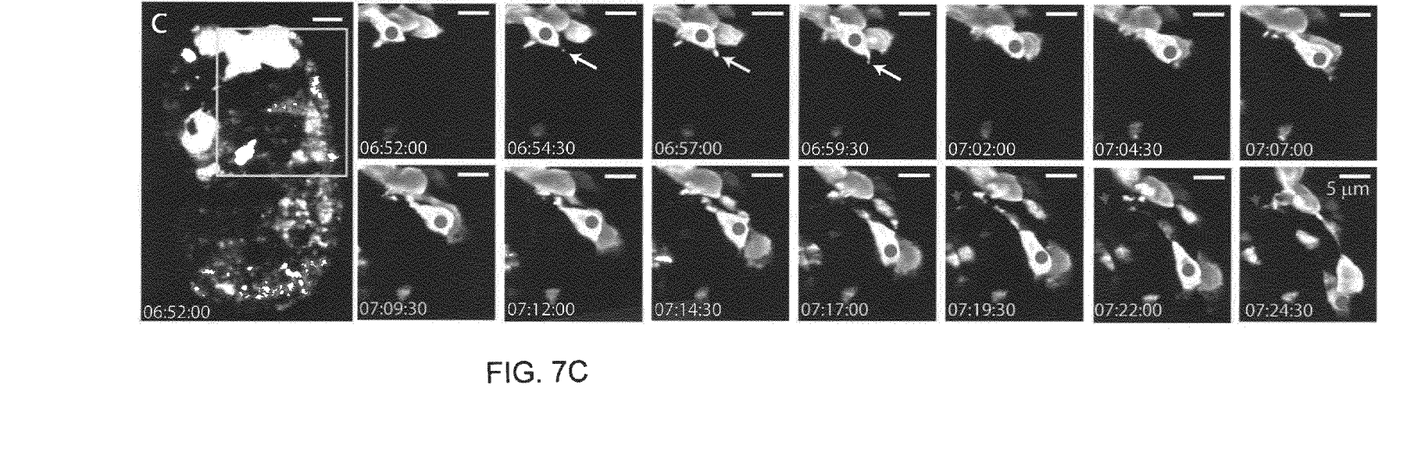
FIG. 7C are images at increased signal-to-noise ratio and a reduced frame rate to highlight cell morphological changes during migration.

The embryos in the test were volumetrically imaged until hatching at 20 volumes per minute, nonperturbatively, and with sufficient signal-to-noise ratio to easily discern individual cells. A subset of data was manually annotated to highlight the bilaterally symmetric canal-associated (CAN)

neurons in the developing embryo as illustrated the images shown in FIG. 7A. The CAN neurons have served as a prime model to study cell migration in *C. elegans*, although it is unknown whether long range migration across the elongating embryo has not been visualized in real-time. Calculation of three dimensional displacements of neurons from the anterior tip of the embryo (e.g., chart of FIG. 7B) permitted extraction of biophysical parameters, such as average speed during the migration process across the embryo (e.g., 0.7 µm per minute for the CAN neuron marked in red). Although the effect of muscular twitching is more pronounced later in embryogenesis (e.g., the jagged lines in the chart of FIG. 7B), the imaging rate of the converted microscope 10 was sufficient to visualize the organism (e.g., images shown in FIG. 6). It was also noted that the temporal resolution may be traded for higher excitation power and thus higher signal rates, which permits observation of finer morphological details in developing neurons. Imaging at 2 volumes per minute over a reduced time period to ensure embryo viability, changes in the leading edge of the CAN neurons were imaged. This allowed for observation of finer processes, such as neuronal growth cones in the animal nerve ring (indicated by the white arrows and red arrowheads illustrated in FIG. 7C). The results of the test demonstrate visualization of neurodevelopmental events at high spatiotemporal resolution. In view of the simplicity of *C. elegans* genetics, the converted microscope 10 may be used for real-time and in tot experimental investigation of neurodevelopment in the embryo.

Figure 5B:
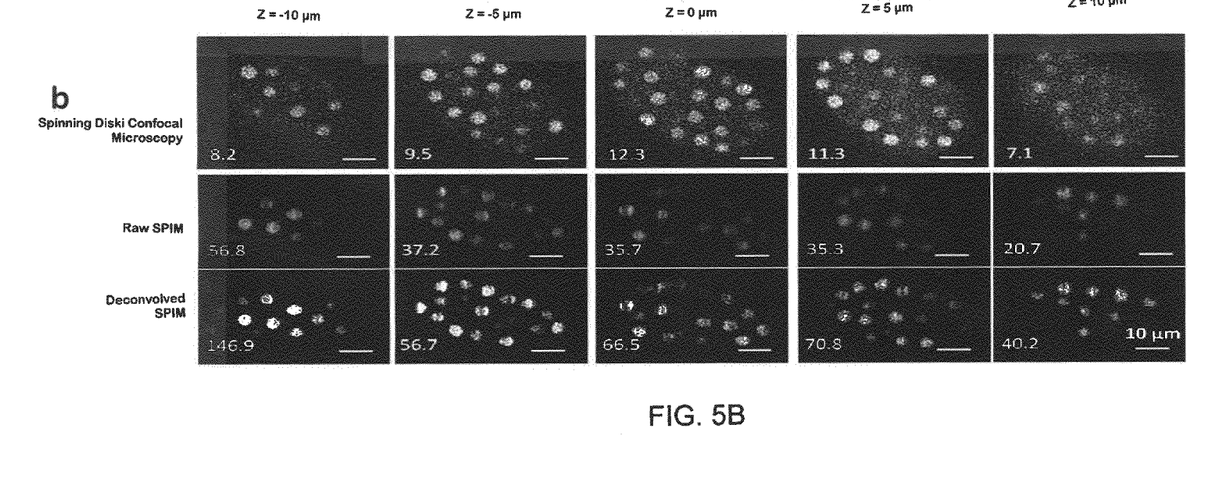
FIG. 5B are images showing the comparison between individual z slices for the time point outlined in red in FIG. 5A with signal-to-noise ratios indicated at the lower left of each photograph.

In one test, a comparison was made between maximum intensity projections at indicated time points (measured relative to fertilization) shown in FIG. 5A, while another comparison was made between individual image slices in the z direction for the time point outlined in red in corresponding images (FIG. 5A) as shown in FIG. 5B. The signal-to-noise ratio values derived from each image (indicated at the lower left portion of each image) were calculated by averaging the pixel values in a region of the image surrounding each nuclei, averaging the averaged pixel values, and then dividing pixel values by a standard deviation of the pixel values in an identically sized background region outside of the region of the embryo.

The images of FIG. 6 were taken from the same dataset used to generate the images of FIGS. 5A and 5B with the time points being measured relative to fertilization, i.e., when the zygote is formed and development of the organism begins. The images show the maximum intensity projections every 3 seconds, thereby demonstrating that the imaging rate of the converted microscope 10 was sufficient to follow the morphology of an amphid support cell as evidenced by the ring-like structure (highlighted by white arrows) that persists through embryonic twitching. We note that the fast rate of embryonic twitching precludes imaging such structures with more conventional microscopies, such as confocal microscopy.

In one embodiment of a test performed on a worm embryo, the excitation objective 16 was designed to result in a beam waist of approximately 1.2 µm from the center of the worm embryo, a value that increases to approximately 3 µm near the edges of the imaging field (+/−20 µm from the center of the embryo). With this imaging arrangement, the full width at half maximum (FWHM) of 100 nm beads (e.g., Invitrogen, F8803) embedded in 2% agarose gel and imaged by the converted microscope 10 was 0.52+/−0.02 µm laterally and 1.70+/−0.39 µm axially over the imaging field of view (N=10 beads), which were values similar to those obtained in tests carried out at a similar NA with other SPIM microscopes.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A module for converting a microscope to provide selective plane illumination microcopy comprising:
   a mount defining a mount body;
   an excitation objective having a first longitudinal axis engaged to one portion of the mount body and a detection objective having a second longitudinal axis engaged to another portion of the mount body, wherein the excitation objective and the detection objective are engaged to the mount such that the first longitudinal axis intersects the second longitudinal axis in a perpendicular geometric relation, and
   a light source for generating in alternating fashion a first plurality of light sheets through the excitation objective and then a second plurality of light sheets through the detection objective, and vice versa, for producing an excitation in a sample that generates an alternating sequence of a first fluorescent emission detected by the excitation objective and then a second fluorescent emission detected by the detection objective, and vice versa.

2. The module of claim 1, wherein the mount body includes a first arm engaged to the excitation objective and a second arm engaged to the detection objective.

3. The module of claim 1, wherein the light source forms a part of a selective plane illumination microscopy (SPIM) arrangement for generating the first plurality of light sheets and the second plurality of light sheets.

4. The module of claim 1, wherein the mount is configured to be engaged to a microscope.

5. The module of claim 1, wherein the microscope comprises:
   a base configured to engage a sample stage for supporting and orienting the sample in an x-y direction; and
   a translational stage configured to engage the stage for orienting the sample in the z-direction.

6. The module of claim 5, wherein the microscope further comprises:
   a conventional objective arrangement in communication with the base for detecting an illumination of the sample at an orientation different from the detection objective.

7. The module of claim 1, wherein the mount has a first arm and a second arm having a perpendicular configuration in which the first arm and second arm are oriented perpendicularly to each other.

8. The module of claim 1, further comprising:
   a piezoelectric objective stage for moving the detection objective along the second longitudinal axis for maintaining the sample in focus.

9. A converted microscope comprising:
   a base engaged to a translation stage and a sample stage, the translation stage being adapted to move in the z direction and the sample stage being adapted to move a sample in the x-y-z directions relative to the base;
   a mount engaged to the translation stage for moving the mount in the z direction, the mount defining a mount body, the mount further including an excitation objective engaged to one portion of the mount body and oriented along a first longitudinal axis and a detection objective engaged to another portion of the mount body and oriented along a second longitudinal axis, wherein the excitation objective and the detection objective are oriented such that the first longitudinal axis and the second longitudinal axis are oriented in a perpendicular geometric relation to each other, and a selective plane illumination microscopy (SPIM) arrangement in communication with the excitation objective and the detection objective, the SPIM arrangement including a light source for generating in alternating fashion a first plurality of light sheets through the excitation objective and then a second plurality of light sheets through the detection objective, and vice versa, for producing an excitation in a sample that generates an alternating sequence of a first fluorescent emission detected by the excitation objective and then a second fluorescent emission detected by the detection objective, and vice versa.

10. The converted microscope of claim 9, further comprising:

a conventional objective arrangement oriented below the sample for detecting the sample when illuminated by the light source.

11. The converted microscope of claim 9, wherein the mount body defines a first arm engaged to the excitation objective and a second arm engaged to the detection objective.

12. The converted microscope of claim 9, wherein the SPIM arrangement further includes a lens and mirror arrangement for directing the sheet of light through the excitation objective.

13. A converted microscope comprising:

a base engaged to a translation stage and a sample stage, the translation stage being adapted to move in the z direction and the sample stage being adapted to move a sample in the x-y-z directions relative to the base;

a mount engaged to the translation stage for moving the mount in the z direction, the mount defining a mount body, the mount further including a first objective engaged to one portion of the mount body and oriented along a first longitudinal axis and a second objective engaged to another portion of the mount body and oriented along a second longitudinal axis, wherein the first objective and the second objective are oriented such that the first longitudinal axis and the second longitudinal axis are oriented in a perpendicular geometric relation to each other;

at least one selective plane illumination microscopy (SPIM) arrangement in communication with the first objective and the second objective with the SPIM arrangement including a light source for generating in alternating fashion a first plurality of light sheets through the first objective and then a second plurality of light sheets through the second objective, and vice versa, for producing an excitation in a sample that generates an alternating sequence of a first fluorescent emission detected by the first objective and then a second fluorescent emission detected by the second objective, and vice versa, wherein the first fluorescent emission is oriented in perpendicular orientation relative to the second fluorescent emission.

14. The converted microscope of claim 13, wherein the first fluorescent emissions are focused onto a first sensor through the second objective and the second fluorescent emissions are focused onto a second sensor through the first objective.

15. The converted microscope of claim 14, wherein the first sensor and the second sensor communicate with a processor for collecting the alternating sequence of first fluorescent emissions and second fluorescent emissions.

16. The converted microscope of claim 15, wherein the processor receives a first image from the first sensor and a second image from the second sensor, wherein the first image and the second image are in perpendicular orientation relative to each other.

17. The converted microscope of claim 16, wherein the processor performs a registration process in which the first image is transposed onto the second image such that the first image is in perpendicular orientation relative to the second image.

18. The converted microscope of claim 17, wherein the first image defines a first axial resolution and a first lateral resolution and the second image defines a second axial resolution and a second lateral resolution, wherein transposing the first image onto the second image permits the first lateral resolution to be transposed over the second axial resolution as well as the second lateral resolution to be transposed over the first axial resolution such that the first lateral resolution enhances the resolution of the second axial resolution and the second lateral resolution enhances the resolution of the first axial resolution.

19. The converted microscope of claim 18, wherein the processor performs a fusion process in which the first image is combined with the second image to form a composite image such that the first lateral resolution is applied to the second axial resolution and the second lateral resolution is applied to the first axial resolution of the composite image in order to enhance the resolution of the composite image.

* * * * *